United States Patent Office 3,302,956
Patented Feb. 7, 1967

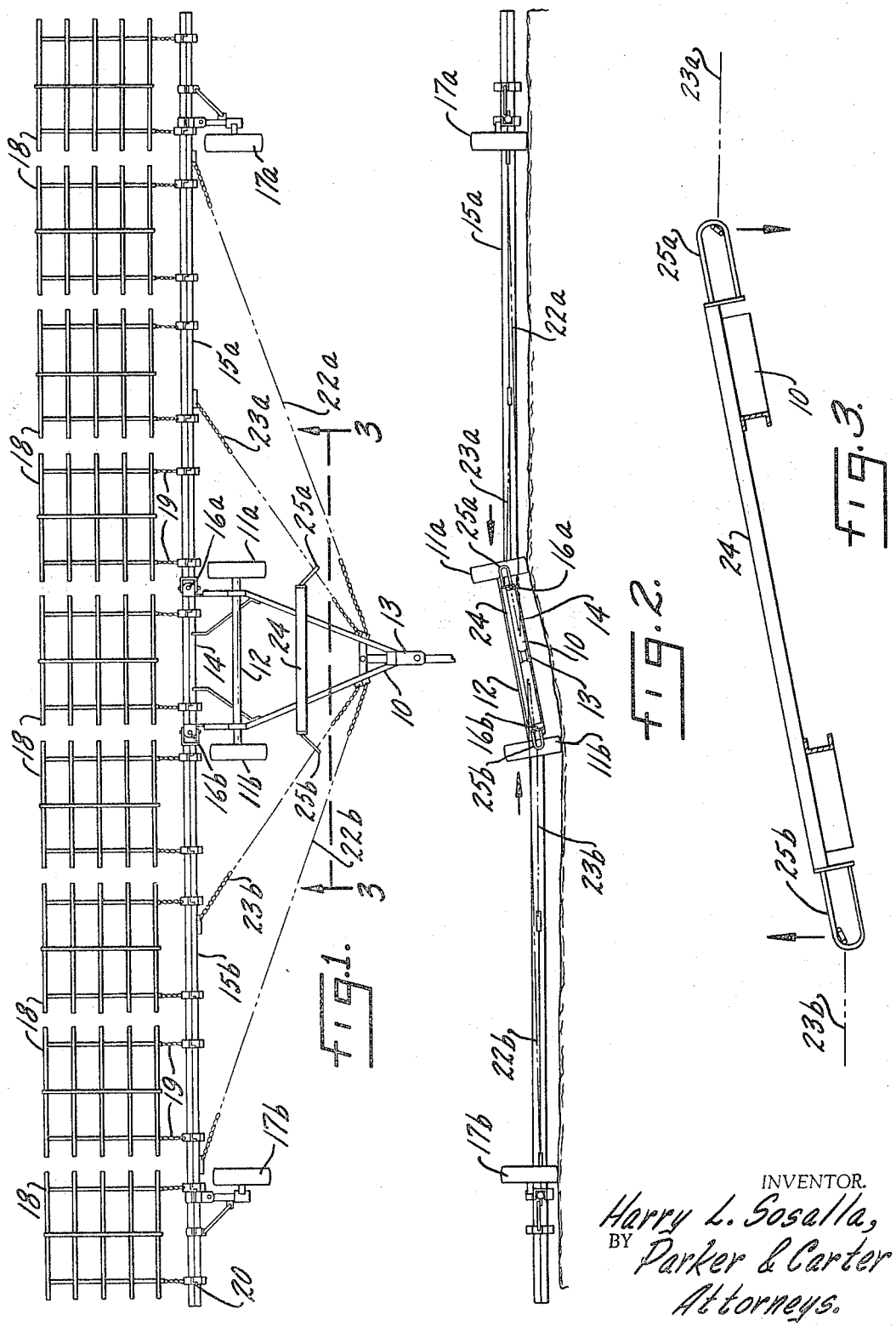

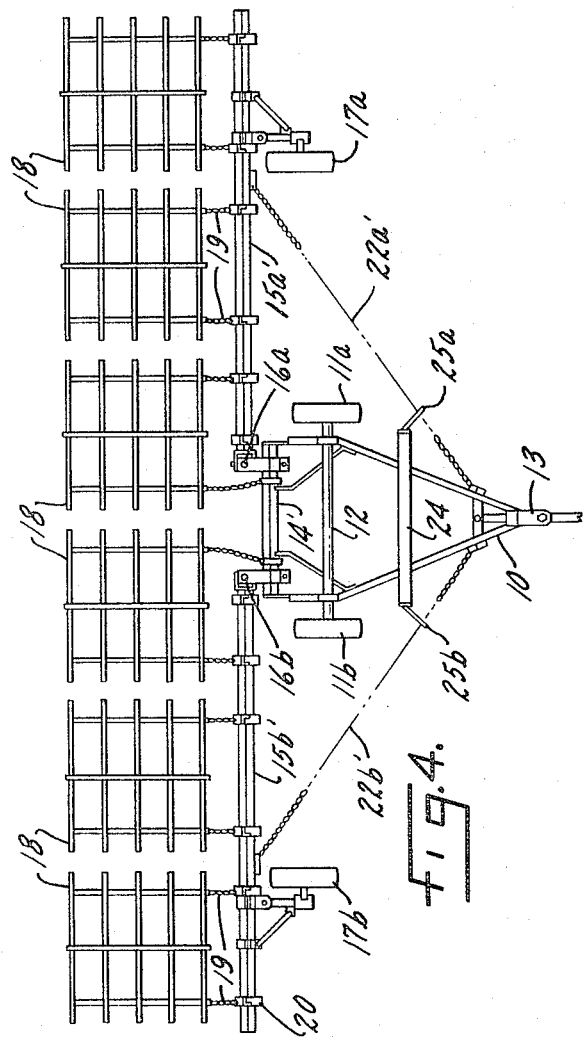

3,302,956
STABILIZER FOR WHEELED HARROW DRAWBAR
WITH FOLDING WINGS
Harry L. Sosalla, Sac City, Iowa, assignor to Noble Manufacturing Company, Sac City, Iowa, a corporation of Iowa
Filed July 16, 1965, Ser. No. 472,451
5 Claims. (Cl. 280—411)

My invention relates to a stabilizer for farm implements that are towed and especially for a harrow drawbar. It is particularly concerned with stabilizer for the type of harrow drawbar having a wheeled frame and folding wings which ride on wing wheels.

A primary object of my invention is a stabilizer which prevents jackknifing of the drawbar frame and drawbar wings when the unit moves over uneven ground.

Another object is a stabilizer which limits extreme vertical movement of the drawbar frame wheels, yet does not interfere with the normal operation of the drawbar over rolling terrain.

Other purposes will appear in the ensuing specification, drawings and claims, in which:

FIGURE 1 is a plan view of a wheeled drawbar with attached wings and harrows;

FIGURE 2 is a front elevational view with some parts removed for clarity, showing the drawbar traversing uneven ground;

FIGURE 3 is an enlarged partial view illustrating the stabilizer bar, loops and chains, taken along line 3—3 of FIGURE 1; and FIGURE 4 is a plan view showing the adaptation of the stabilizer of my invention to a smaller drawbar.

A harrow drawbar with which my invention can be utilized may include a frame 10 having ground engaging wheels 11a and 11b journalled on an axle 12 mounted on the frame. As depicted, the frame may be A-shaped, with the axle mounted near the base of the A, and a towing attachment 13 connected to the apex of the A. The portion of the frame located opposite to the towing connection functions as a drawbar center assembly 14. Attached to the outer ends of this drawbar center assembly 14 are drawbar wings 15a and 15b. To permit horizontal and vertical movement of the drawbar wings relative to the frame 10, the connections between the drawbar center assembly and the drawbar wings may be universal joints 16a and 16b. For the purpose of holding the outer ends of the drawbar wings off the ground, wing wheels 17a and 17b may be provided. As is conventional, the harrow sections 18 may be connected to the drawbar center assembly and drawbar wings by means of chains 19. Uprights 20 of conventional construction to support the harrow sections in an inoperative condition may be mounted on the drawbar center assembly and draw-bar wings.

Chains or other uni-directional restraining members such as cables may be provided to extend between the frame and the drawbar wings to restrain rearward folding of the drawbar wings during harrowing operations. These chains may be connected to the frame 10 adjacent the apex thereof, as shown in FIGURE 1. In the drawbar shown in FIGURES 1 to 3, two sets of chains are provided, with one set 22a and 22b connected to the drawbar wings adjacent the outer ends thereof and the other set 23a and 23b connected to intermediate portions of the drawbar wings. The chains are sized to extend tautly between the wings and the frame when the wings are in their normal positions of lateral alignment with the drawbar.

To limit the amount of vertical pivoting of the drawbar wings relative to the frame 10 and drawbar center assembly 14, a stabilizer in the form of an elongated bar 24 having guides in the shape of loops 25a and 25b and attached to the ends thereof is mounted on and attached to the drawbar frame. The loops 25a and 25b receive the intermediate chains 23a and 23b and engage these chains upon tilting of the frame relative to the wings to limit the amount of vertical movement of the frame and drawbar wings relative to each other. To accomplish this, the loops are sized and positioned to permit the chains 23a and 23b to extend freely through the loops without contact therebetween when the drawbar wings are in their normal positions of horizontal alignment with the frame 10 and drawbar center assembly 14. However, when the frame tilts relative to the drawbar wings, as shown in FIGURE 2, the elongated bar and loops move vertically relative to the chains so that the loops contact the chains 23a and 23b. Vertical movement of the stabilizer bar and frame relative to the drawbar wings is thereby limited by the engagement of the chains with the stabilizer loops. As can best be seen in FIGURE 3, the forces exerted by the chains against the loops act in opposite directions to each other and each force acts oppositely to the direction of tilting of the frame adjacent its loop so as to return the frame and drawbar wings to their original position of horizontal alignment.

FIGURE 4 shows the adaptation of my stabilizer to a wheeled drawbar which has a single set of uni-directional restraining members, which are chains 22a' and 22b'. This wheeled drawbar is adapted to pull an even number of harrows, six in this example. A modified drawbar center assembly 14' is used to permit closer spacing of the universal joints 16a and 16b. Drawbar wings 15a' and 15b' of reduced length are connected to the universal joints. The elongated bar 24 and guides 25a and 25b which make up the stabilizer are positioned relative to the frame 10 to receive the chains 22a' and 22b'. The stabilizer acts on these chains when the cart tilts relative to the drawbar wings in the same manner as the stabilizer acts on the chains 23a and 23b of the drawbar of FIGURES 1 to 3.

The use, function and operation of my invention are as follows:

With the increase in the length of drawbar wings to enable modern drawbars to accommodate as many as eight or nine harrow sections, problems have been encountered due to the tremendous compressive forces exerted against the drawbar cart of frame 10 when the frame and drawbar wings move out of horizontal alignment with one another. This can occur when a wheel of the cart or of a drawbar wings moves up or down in following the terrain of the field. As can be seen in FIGURES 1 and 2, the sets of chains 22a and 22b and 23a and 23b which extend between the drawbar wings and the frame, and especially chains 22a and 22b, exert forces on the drawbar wings having components extending along the length of the wings and toward the drawbar center assembly 14, with these forces acting on the universal joints 16a and 16b which connect the drawbar center assembly and the wings.

While both drawbar wings are in the same plane as the drawbar center assembly 14, the component forces exerted by the chains along the wings cancel each other and the frame and wings remain stable. If, however, one of the wheels, for example, wheel 11a of the frame moves vertically, as shown in FIGURE 2, or if one of the wing wheels moves vertically, the drawbar wings and the drawbar center assembly will no longer be in a common plane, and the component forces, which are being exerted by the chains along the wings and against the universal joints, will no longer cancel each other out but will form a force couple, as indicated by the arrows in FIGURE 2 to twist the frame. In this example the force couple will tend to lift the universal joint 16a adjacent the higher wheel 11a and cause the frame to pivot about the opposite and lower ground-engaging wheel 11b, thus jackknifing the frame and drawbar wings. A similar situation occurs if one frame wheel moves downwardly relative to the other.

The purpose of my stabilizer bar 24 and loops 25a and 25b is to prevent this jackknifing by limiting the amount of vertical pivoting or movement of the drawbar wings and the frame relative to each other. This is accomplished by utilizing the loops on the stabilizer to engage the intermediate chains 23a and 23b extending between the frame and the wings. For example, when wheel 11a, shown in FIG. 2, moves upwardly relative to the other wheel 11b, due to rolling over higher ground, the forces exerted by the chains 22a and 22b along the drawbar wings 15a and 15b have a tendency to jackknife the frame and drawbar wings for the reasons previously mentioned. However, the raising of the wheel 11a also raises the corresponding end of the stabilizer bar and its loop 25a relative to the chain 23a which passes through the loop. Since the ends of this chain are fixed to the drawbar wing and the forward portion of the cart frame, the chain will remain taut and will not move vertically as much as its loop, which is connected only to the frame. Consequently, the bottom portion of the loop will engage the chain, as shown in FIGURE 3, to restrain upward movement of the stabilizer, cart and wheel. At the same time the loop 25b on the opposite end of the stabilizer bar which have moved downwardly engages its intermediate chain 23b. The chain exerts an upward force on this loop tending to raise the opposite wheel 11. The forces exerted on the stabilizer bar by the intermediate chains form a force couple, indicated by arrows in FIGURE 3, which acts in opposition to the force couple shown in FIGURE 2, which is acting on the universal joints to jackknife the frame and drawbar wings. Thus, the forces acting on the stabilizer bar resist jackknifing of the drawbar.

In FIGURE 4, my invention is shown applied to a wheeled drawbar having only one set of chains which extend from the cart and connect to the drawbar wings adjacent the outer ends thereof. In this modified form, the elongated bar 24 and guides 25a and 25b are positioned to receive the chains 22a' and 22b' and the guides act on these chains to stabilize the cart and wings in the same manner as the guides act on the intermediate chains 23a and 23b to stabilize the structure described above.

I claim:
1. A stabilizer means for use with a farm implement having
   an elongated frame with ground engaging wheels mounted adjacent the rear of said frame and a towing connection located adjacent the front of the frame,
   drawbar wings extending laterally of said frame and pivotally attached to rear thereof for vertical and horizontal movement relative to said frame,
   ground engaging wheels attached to said drawbar wings adjacent the outer ends thereof, and
   uni-directional restraining means connected to the drawbar wings and to the front of said frame to prevent rearward folding of said wings,
   said stabilizer means being attached to said frame and having guides to receive said restraining means and to engage said restraining means upon tilting of the frame relative to the drawbar wings to restrain vertical movement of the wings and the frame relative to each other.

2. The structure of claim 1 further characterized that said stabilizer means includes an elongated bar attached to said frame and having closed loops attached to the outer ends thereof to receive and guide said restraining means.

3. A stabilizer means for use with a farm implement having
   an elongated frame having ground engaging wheels mounted adjacent the rear of said frame and a towing connection located adjacent the front of the frame,
   drawbar wings extending laterally of said frame and pivotally attached to the rear thereof for vertical and horizontal movement relative to said frame,
   ground engaging wheels attached to said drawbar wings adjacent the outer ends thereof, and
   uni-directional restraining means connected to the drawbar wings and to the front of said frame to prevent rearward folding of said wings including a first set of restraining means attached adjacent to the outer ends of said wings and a second set of restraining means attached to said wings intermediate the outer ends and said pivotal connections,
   said stabilizer means being attached to said frame to receive said second set of restraining means and having guides to engage said restraining means upon tilting of the frame relative to the drawbar wings to restrain vertical movement of the wings and the frame relative to each other.

4. The structure of claim 3 further characterized in that said stabilizer means includes an elongated bar affixed to said frame and extending laterally thereof with guides in the shape of closed loops attached to the ends of said bar.

5. A stabilizer means for use with a towed farm implement having a frame with ground engaging wheels, drawbar wings extending laterally of said frame and attached thereto for vertical and horizontal movement relative to said frame, ground engaging wheels attached to said drawbar wings and unidirectional restraining means connected to the drawbar wings and to said frame to prevent rearward folding of said wings,
   said stabilizer means including guides attached to said frame and adapted to engage said restraining means upon titling of the frame and drawbar wings relative to one another to restrain vertical movement of the wings and frame relative to each other.

References Cited by the Examiner
UNITED STATES PATENTS

| | | | |
|---|---|---|---|
| 3,062,562 | 11/1962 | Van Horn | 280—411 |
| 3,086,598 | 4/1963 | Gellner | 172—456 |
| 3,190,367 | 6/1965 | Kopaska | 172—456 |

LEO FRIAGLIA, *Primary Examiner.*